(12) United States Patent
Stalker (10) Patent No.: US 7,069,572 B2
(45) Date of Patent: Jun. 27, 2006

(54) BROADCAST DATA ACCESS SYSTEM FOR MULTIMEDIA CLIENTS IN A BROADCAST NETWORK ARCHITECTURE

(75) Inventor: Altan J. Stalker, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/392,103

(22) Filed: Mar. 18, 2003

(65) Prior Publication Data

US 2003/0177230 A1    Sep. 18, 2003

Related U.S. Application Data

(63) Continuation of application No. 09/219,714, filed on Dec. 23, 1998, now abandoned.

(51) Int. Cl.
   *G06F 15/16* (2006.01)
(52) U.S. Cl. .................. 725/34; 709/206; 709/207; 725/86
(58) Field of Classification Search ................ 709/202, 709/203, 206, 217, 219
   See application file for complete search history.

(56) References Cited

U.S. PATENT DOCUMENTS 5,617,565 A    4/1997   Augenbraun et al.
5,752,159 A    5/1998   Faust et al.
5,805,825 A    9/1998   Danneels et al.
5,855,008 A *  12/1998  Goldhaber et al. ........... 705/14

FOREIGN PATENT DOCUMENTS

EP        0 854 650      6/1998
WO        WO 98/26528    6/1998
WO        WO 98/37698    8/1998

OTHER PUBLICATIONS

Huang, S. J.; "MPEG Digital Storage Media (DSM) Control Command," Signal Processing. Image Communication, NL, Elsevier Science Publishers, Amsterdam, vol. 6, No. 6, Feb. 1, 1995.

* cited by examiner

*Primary Examiner*—Paul H. Kang (57) ABSTRACT

A broadcast data access system is provided for receiving broadcast data by applications residing on a multimedia client, where the broadcast data is a set of modules on a data carousel that are being broadcast over a broadcast network. The broadcast data access system includes an interest manager configured to store a plurality of interests, such that each interest identifies an available module on the data carousel being requested by an application. The system further includes at least one application having registered an interest for a first module with the interest manager, and a dispatcher distributing the first module to the requesting application by accessing the interest manager.

18 Claims, 7 Drawing Sheets

BROADCAST DATA ACCESS SYSTEM FOR MULTIMEDIA CLIENTS IN A BROADCAST NETWORK ARCHITECTURE

CROSS-REFERENCE TO RELATED APPLICATIONS

The present application is a continuation of U.S. patent application Ser. No. 09/219,714, which was filed on Dec. 23, 1998, now abandoned with a common assignee.

BACKGROUND OF THE INVENTION

The present invention relates generally to a broadcast data access system, and more particularly to an architecture for supporting applications that receive broadcast data from a data carousel over a broadcast network.

In a broadcast network architecture, various types of data can be delivered from a server to a group of multimedia clients. Typically, multimedia clients do not have enough resources to store all of the data that is being broadcast over the network. Even if the client could store all of the data, there is no guarantee that the client will receive an error-free copy of the data in a single transmission of the data. Moreover, the client has no way of requesting that a server resend missing or defective data. Since the data is being sent to many clients, it might also be prohibitive to resend missing or defective data to each of the clients that request it.

A broadcast data carousel is commonly used for transporting data in a broadcast environment. This underlying mechanism for transporting data is defined in the MPEG-2 DSM-CC specification (i.e., ISC/IEC 13818-6). Using this mechanism, the server repeatedly sends data over a period of time so that a client who is interested in the data may receive it only when it is required. If a client misses some of the data or receives defective data, it waits for the next broadcast of the data to receive any data that it may need.

A Broadcast File System (BFS) provides a layer on top of the broadcast data carousel that hides the details of the underlying transport mechanism from the server and clients. In particular, BFS creates a mapping between the carousel/file number and a module name. As a result, the server and clients view the broadcast data as a standard hierarchical file system similar to files found on a disk operating system.

Therefore, it would be desirable to provide a broadcast data access system for receiving broadcast data from a data carousel in a simple, efficient, and flexible manner. It should support multiple data sources between the broadcast network and the multimedia client, such that each source can receive a different form of encoded broadcast data. In addition, the broadcast data access system should be able to efficiently process data packets received in a non-sequential order, as well as simultaneously fulfill multiple requests for the same data packets by different applications. To lessen processing overhead, filters are dynamically installed on the client. Lastly, the present invention should provide a method for downloading and synchronizing a directory module with the content of the data carousel being broadcast to the client.

DETAILED DESCRIPTION OF THE PREFERRED EMBODIMENT

The following description of the present invention is merely exemplary in nature and is in no way intended to limit the invention or its uses. Moreover, the following description, while depicting a broadcast data access system that is designed to reside on a conventional set top box, is intended to adequately teach one skilled in the art to make and use a similar architecture for a variety of consumer multimedia clients including, but not limited to, intelligent televisions, Internet terminals and advanced DVD players.

Figure 1:
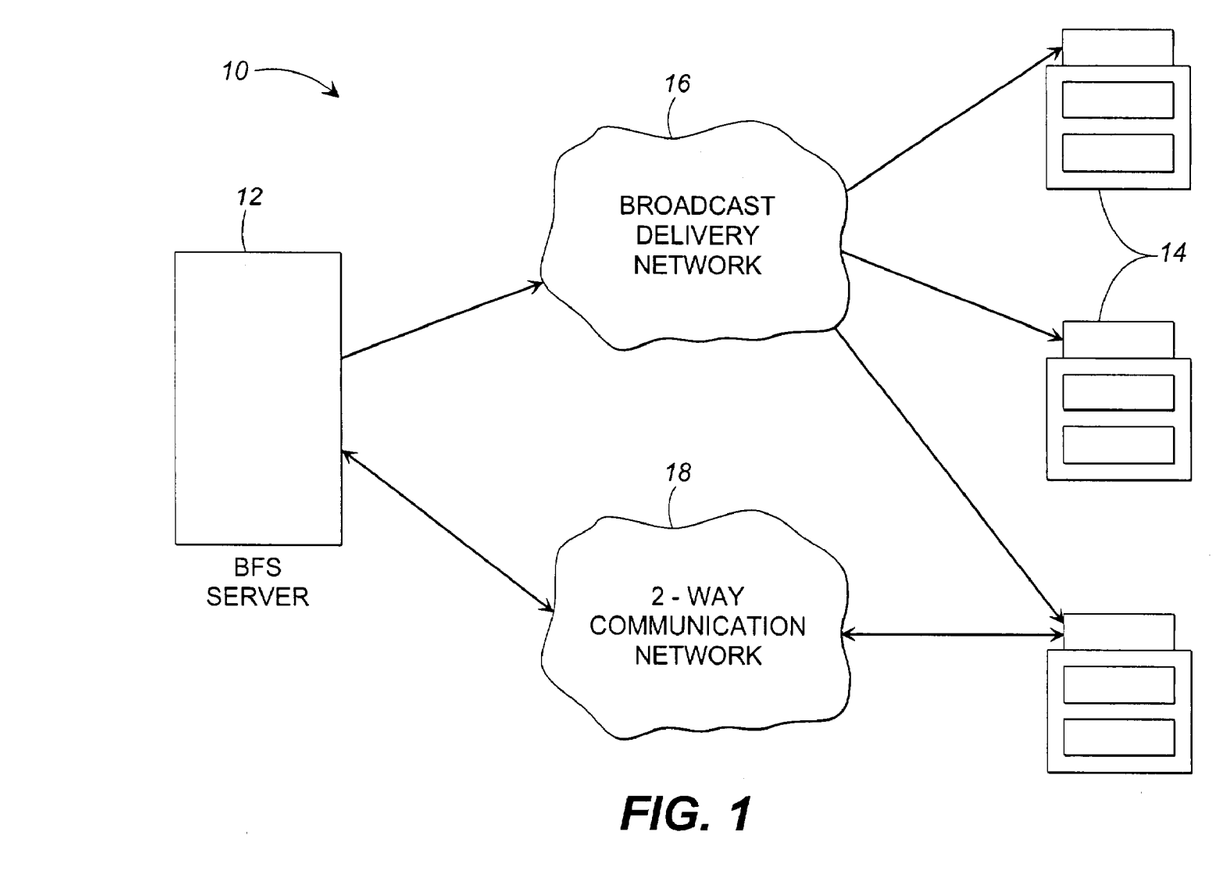
FIG. 1 is a diagram depicting the basic components in a typical broadcast file system in accordance with the present invention.

A Broadcast File System 10 (BFS), as depicted in FIG. 1, provides an architecture for delivering various types of data from a BFS server 12 (or group of servers) to a plurality of multimedia clients 14 over a broadcast network 16. It is also envisioned that a two-way communication network could be used in conjunction with the broadcast file system 10 of the present invention. The underlying mechanism for transporting data across the network 16 relies on a broadcast data carousel that is defined in the MPEG-2 DSM-CC specification (i.e., ISC/IEC 13818-6). Typically, broadcast data is grouped into files that are subdivided into fixed-size data blocks and then broadcast in a non-sequential order using the data carousel mechanism. However, BFS 10 of the present invention provides a layer on top of the broadcast data carousel that hides the details of this underlying transport mechanism from the server 12 and clients 14. Within a data carousel, individual data files are called modules. Since modules are identified by numbers (not names), BFS 10 creates a mapping between file numbers and module names. In this way, the server 12 and clients 14 of BFS 10 view these modules in a standard hierarchical file system similar to files found on a disk operating system.

BFS server 12 is the component responsible for storing, assembling and delivering modules across the network 16. While the following discussion is provided with reference to one data carousel, it is readily understood that the explanation is applicable to more than one data carousel. A top level data carousel contains at least one module known as the BFS directory which includes the module names for all of the other modules on this or any other data carousel. As modules are added to the data carousel, BFS server 12 creates a module name (i.e., identifier) for each new module and then updates the BFS directory structure. Similarly, when modules are updated and/or deleted from the data carousel, the BFS directory structure is updated by BFS server 12. Applications residing on a multimedia client 14 in turn utilize the BFS directory to access modules contained on the broadcast data carousel. The network 16 may employ any underlying transport protocol (e.g., MPEG transport and/or UDP/IP) that has the ability to deliver data packets across the network to the client.

Figure 2:
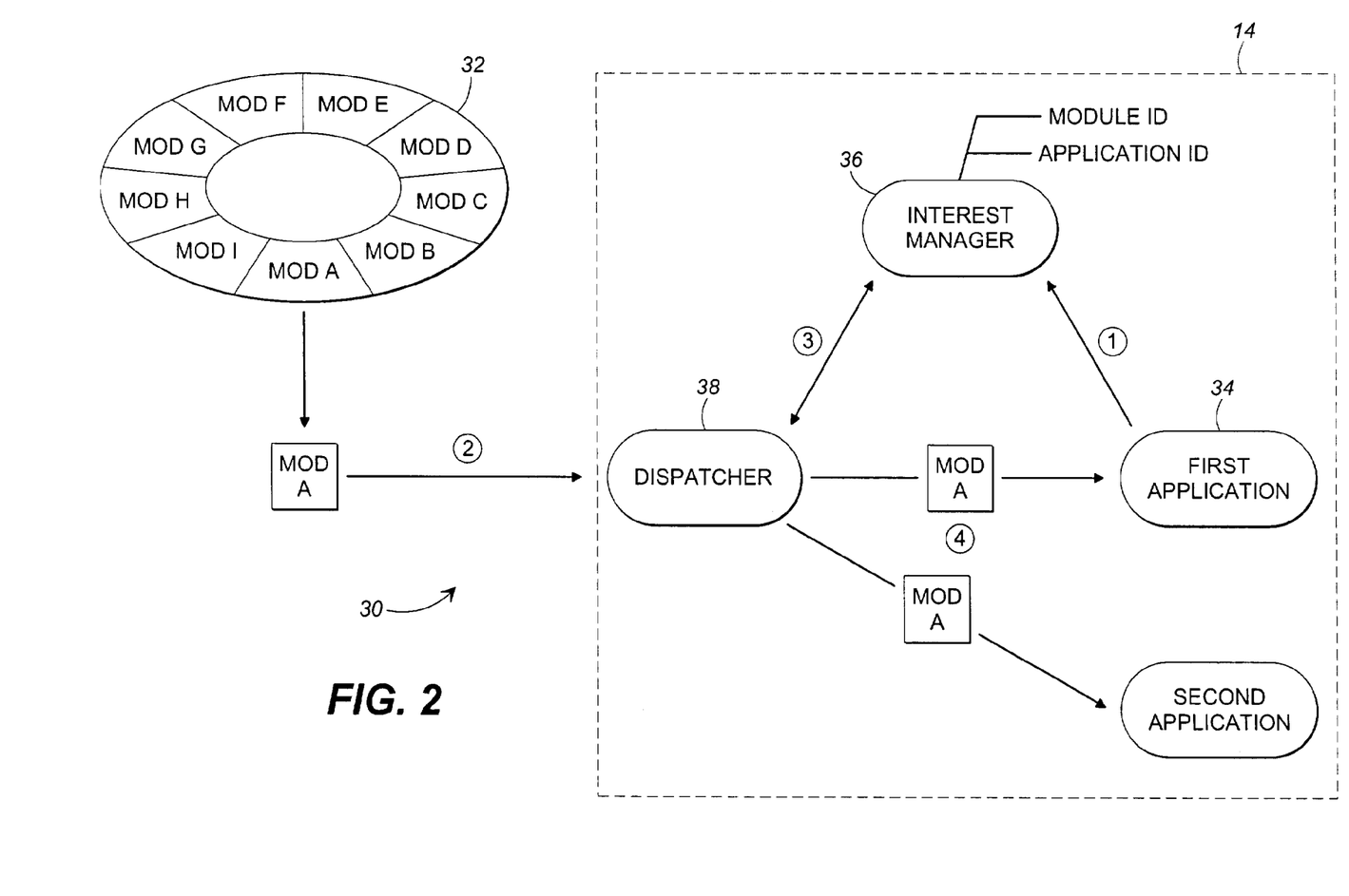
FIG. 2 is a data flow diagram illustrating a preferred embodiment of the broadcast data access system of the present invention.

A broadcast data access system 30 of the present invention serves as the interface between the set of modules contained on the data carousel 32 and the various applications residing 34 on multimedia client 14. Referring to FIG. 2, the broadcast data access system 30 on each multimedia client 14 includes an interest manager 36 that is configured to store a plurality of interests. To receive broadcast data from the data carousel 32, an application 34 registers an interest with the interest manager 36 (e.g., a first application registers a first interest requesting a first module from the data carousel). For purpose of this discussion, the term "application" signifies any software module, including the operating system, which may reside on the multimedia client 14. For each module received by the multimedia client 14, a dispatcher 38 accesses the interest manager 36 to determine if any application residing on that client 14 has requested that module, and if so distributes that module to the appropriate application 34.

Figure 3:
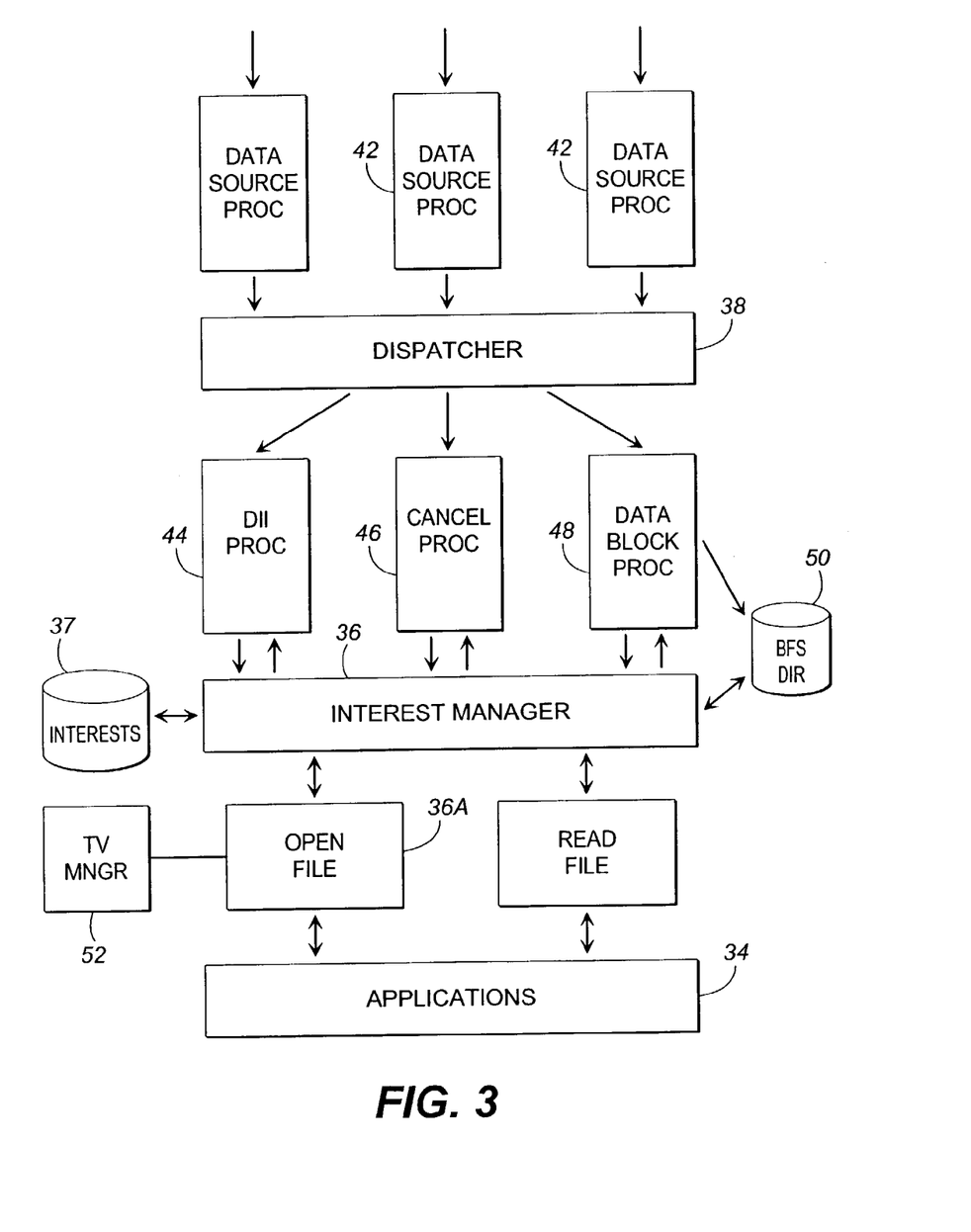
FIG. 3 is a block diagram showing the software architecture for the broadcast data access system of the present invention that resides on each multimedia client.

A more detailed implementation of the broadcast data access system 30 is shown in FIG. 3. Preferably, data access system 30 supports at least two data sources: a QAM modulated in-band source, and a QPSK modulated out-of-band source. In the case of a set-top box, these multiple data sources may be received via an HFC connection. Since the data access system 30 is designed to support different types of data sources, it provides a data source processor 42 for each of these data sources. As data blocks arrive at the client, data source processor 42 performs source specific processing on each data block, including but not limited to, removing header information, verifying checksum, and decompression.

Once pre-processed by a data source processor 42, data blocks are passed along (in DSM-CC format) to a dispatcher 38. Dispatcher 38 may perform some additional data block verification (e.g., check payload length). However, based on the particular type of DSM-CC message, the dispatcher 38 is primarily responsible for directing each incoming data block to an appropriate processor. Data access system 30 currently incorporates three specific processors: a download information indication (DII) processor 44, which receives DSM-CC download information indication (DII) messages; cancel processor 46, which receives DSM-CC messages that indicate when a module has been removed from the data carousel; and data block processor 48, which receives all other types of data blocks. For the in-band QAM channel, data access system 30 also interacts with a TV manager 52, which provides the functionality to select and manipulate in-band data source.

When an application requests to "open" (or retrieve) a module on the data carousel, it registers this request with the interest manager 36. The interest manager 36 maintains a list of modules that the data access system 30 is currently interested in receiving from the data carousel. Thus, an interest exists for every application request. An identifier (e.g., source id, carousel id, module id, version id, etc.) that uniquely identifies the requested module as well as an identifier for the requesting application are stored in a data structure 37 associated with the interest manager 36. Once an interest has been registered by an application 34, all data blocks that match that interest are processed by the data block processor 48.

In addition to registering each application request, an open file component 36A of the interest manager 36 will interface with the BFS directory 50 to ensure that the requested module exists on the data carousel. Generally, DII messages contain a directory of all of the modules on the carousel and are periodically received (e.g., multiple times per second) by the DII processor 44. As part of this synchronization process, the open file component 36A also verifies that the module exists in accordance to the most recently received DII message. Next, it checks that the version number for the module retrieved from the BFS directory matches the version for that module included in the DII message. In this way, the interest manager 36 ensures that the applications request to open a module is synchronized with the module contained on the data carousel. Because modules are delivered on multiple sources at different rates, it is important to implement this synchronization process; otherwise an application may read data from either an older version of the module or possibly even a newer version of the module. It is also envisioned that a filter may be dynamically installed by the open file component 36A that allows DII messages for this carousel to pass through to the dispatcher 38. Once the synchronization process is complete, the filter is removed so that DII messages will not unnecessarily pass through to the dispatcher 38.

Figure 4:
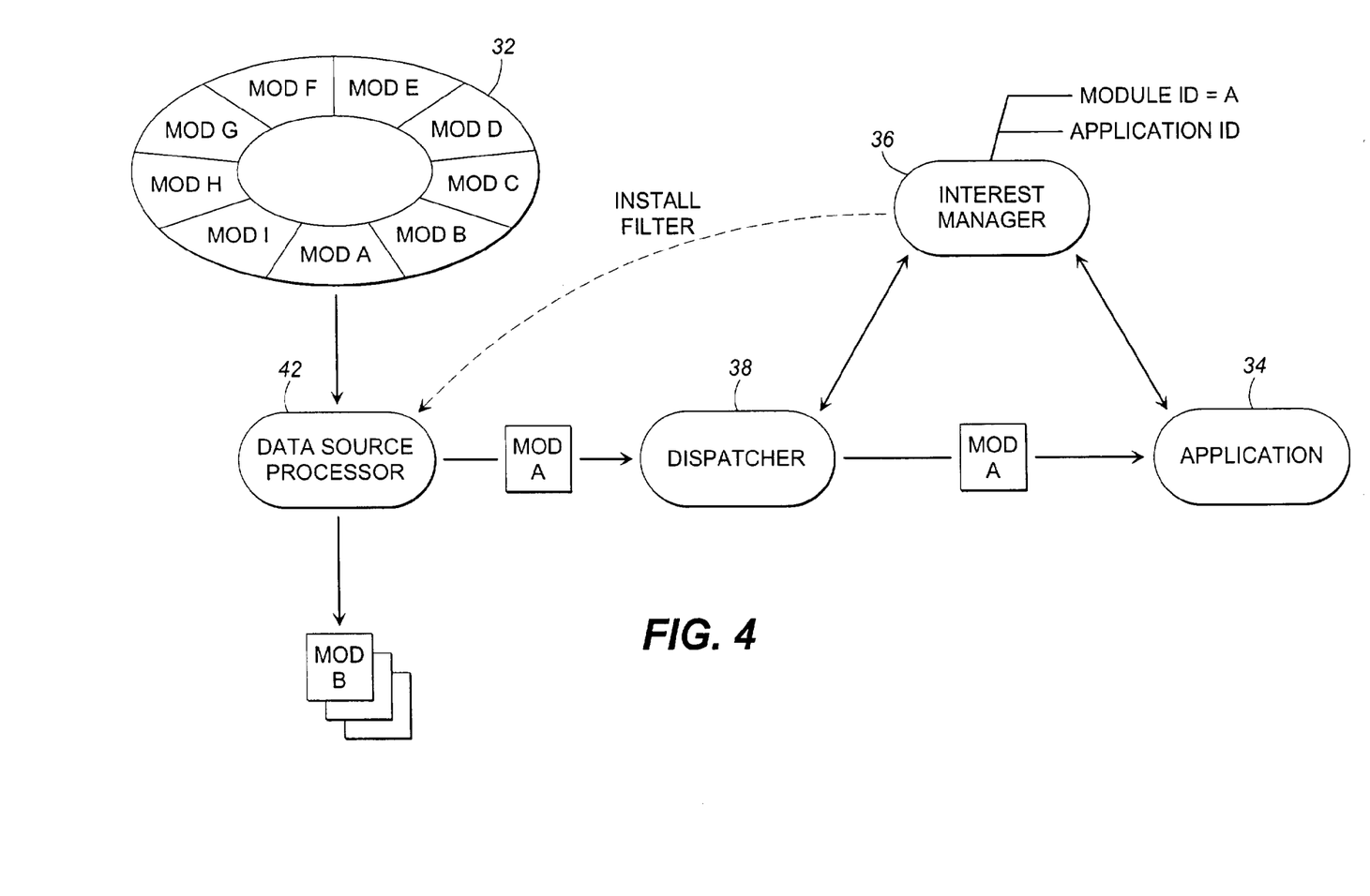
FIG. 4 is a diagram showing dynamic filter installation in accordance with the present invention.

To more efficiently process incoming data blocks, interest manager 36 also dynamically installs filters for each requested interest. Referring to FIG. 4, when an application 34 registers an interest, the interest manager 36 installs a filter in the corresponding data source processor 42. A module identifier encapsulated in each data block is compared to each registered interest. Data blocks not associated with any registered interest are discarded before any unnecessary processing occurs on the client. In this way, only data blocks associated with a registered interest undergo pre-processing in the data source processor 42 and are allowed to pass through to the dispatcher 30. Once all of the data blocks for a particular interest have been received by the client, interest manager 36 removes the filter for that interest.

Typically, a data carousel broadcasts all of the data on the carousel before it rebroadcasts any of the data. Therefore, when an application makes a new data request, the response time depends on the data's location relative to where the carousel is in the broadcast cycle. For example, a carousel having ten data blocks may be currently broadcasting the fifth data block. An application that requests data contained in the seventh block will receive that data faster than an application that requests data contained in the ninth block. If it is the eighth block that is currently being broadcast, the reverse is true; an application that requests data contained in the ninth block will receive that data faster than an application that requests data contained in the seventh block.

Therefore, data block processor 48 reads the data from a data carousel as it is broadcast; it does not wait for the beginning of the data to begin reading. For instance, an application may be interested in a module contained in blocks 2 to 6. If it starts reading as block 4 is broadcast, data block processor 48 copies the data in block 4 to the application's buffer and then reads the data in each successive block that is broadcast. Subsequent data blocks associated with the requested module (i.e., blocks 5, 6, 2, and 3) are copied to the application's buffer, whereas data that is not part of the module (i.e., blocks 7, 8, 9, 10 and 1) are discarded.

Figure 5A:
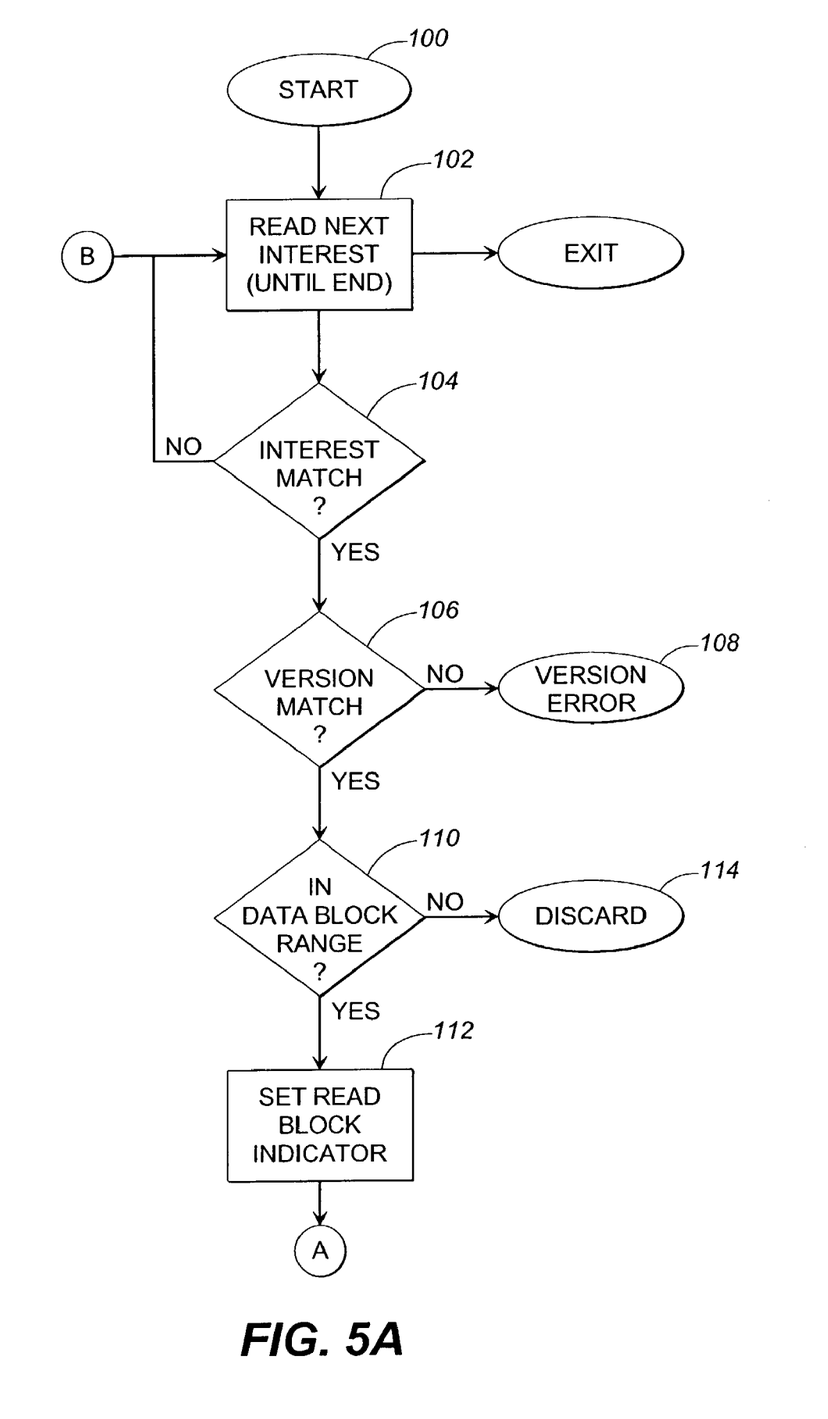
FIGS. 5A and 5B are a detailed flowchart illustrating a preferred embodiment of the data block processor of the present invention.
Figure 5B:
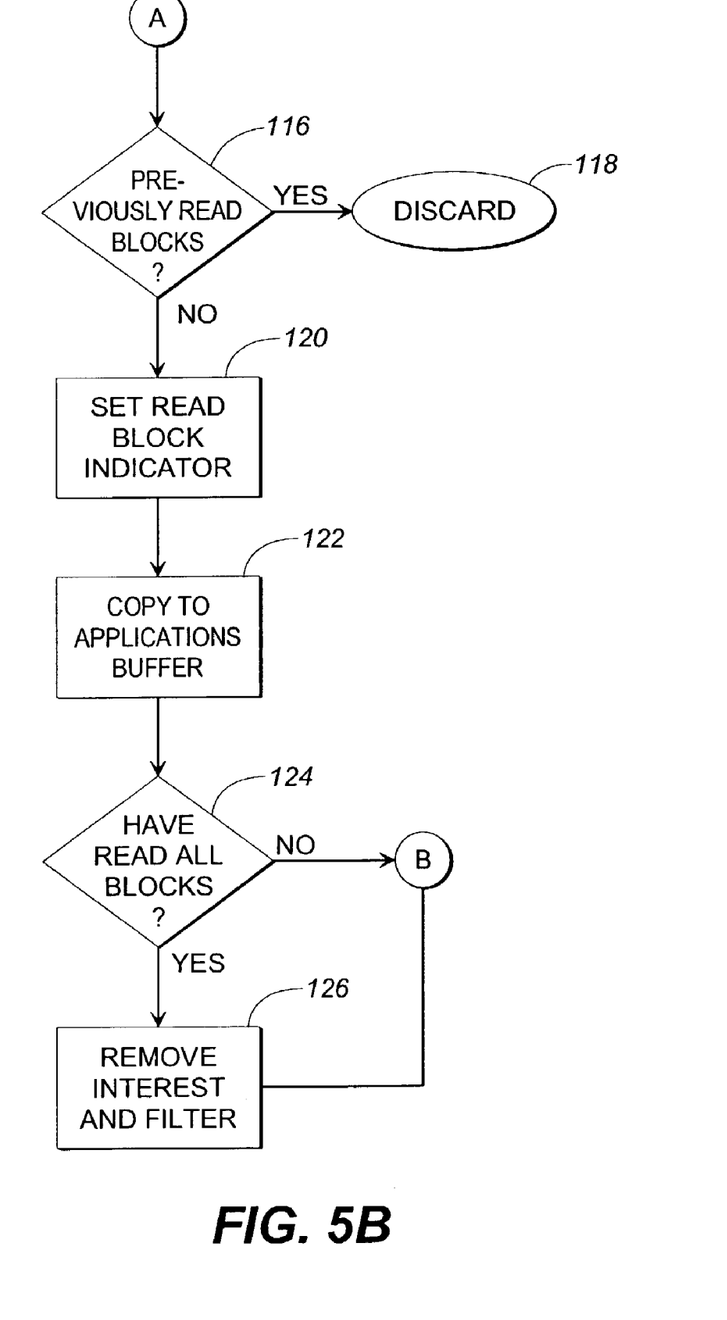

FIGS. 5A and 5B are a flowchart showing a more detailed implementation of the data block processor 48. Start block 100 begins the processing for each incoming data block. In block 102, data block processor 48 interfaces with the interest manager 36 to retrieve a registered interest. Decision block 104 determines if the incoming data block matches this interest, and if so continues processing in block 106. If the incoming data block does not match the registered interest, data block processor 48 retrieves the next interest. Because all of the interests are evaluated for each data block, multiple interests can be served by the same incoming data block.

Decision block 106 compares the version number for each incoming data block to the expected version number contained in the BFS directory. This is important because a module can be changed on the carousel as individual data blocks for that module are being read by data access system 30. If the version numbers match, then processing proceeds to decision block 110. On the other hand, if the version number does not match, processing branches to an error subroutine 108.

Next, decision block 110 determines if a data block falls within the desired range of data blocks. For each data blocks within the desired range, Block 112 sets a Read Block indicator. Data blocks outside the desired range are discarded in block 114. Read Block indicator is an array data structure used to monitor which data blocks have been read from the data carousel. Each bit in the array represents a data block in the requested module, such that if the bit is on (i.e., set to 1), then the block has been read, but if the bit is off (i.e., set to 0), then the block has not been read. Using this indicator allows data block processor 48 to receive data blocks in any order from the data carousel, and thus eliminates any unnecessary memory copies.

By evaluating the Read Block Indicator, decision block 116 determines if an incoming data block has been previously received by the client. For previously unread data blocks, block 120 sets the appropriate bit in Read Block indicator and then copies the data block to the corresponding application buffer space (or alternatively placed in cache memory) in block 122. On the other hand, previously read data blocks are discarded in block 118. Decision block 124 evaluates whether all of the data blocks for a requested module have been read (i.e., all bits set to 1). Once all of the data blocks have been read, data block processor 48 interfaces with interest manager 36 to remove the interest and filter for that requested module in block 126, but in either case processing continues by reading the next interest in block 102. Once all of the interests have been evaluated with respect to an incoming data block, processing is completed for that data block.

Since the data access system 30 receives data from multiple data sources, each of which may have different content as well as different data rates, the BFS directory may not always be in synch with the content of the data carousel being broadcast to the client. For example, a module (including the BFS directory module) can be changed on the carousel as individual data blocks for that module are being read by data access system 30. Therefore, the data block processor 48 also provides a method for downloading and synchronizing the BFS directory on the client.

Figure 6:
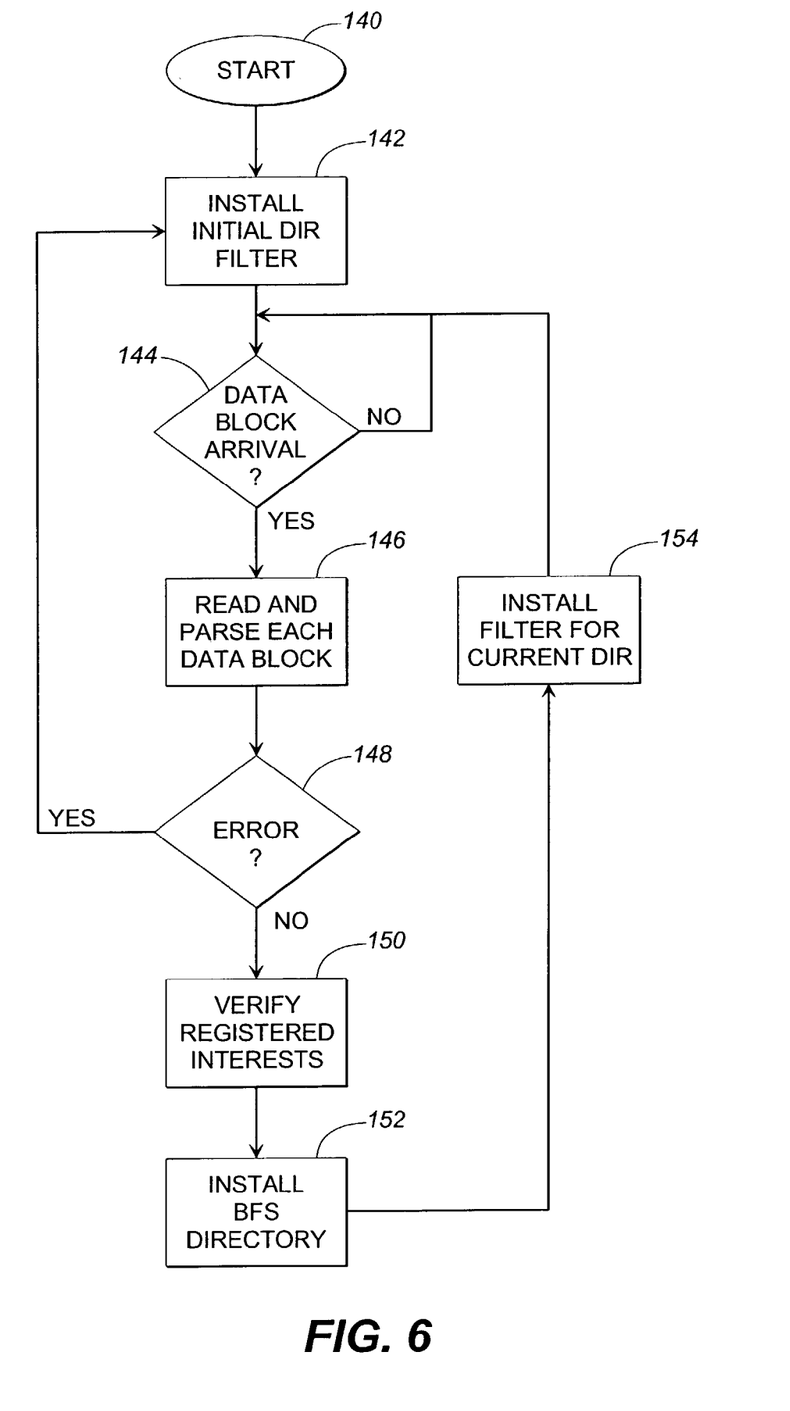
FIG. 6 is a detailed flowchart illustrating a preferred embodiment of a portion of the data block processor that handles downloading and synchronizing the BFS directory onto the client.

FIG. 6 is a flowchart showing a portion of the data block processor 48 that handles the downloading of the BFS directory. Initially, when a set-top box on an (RF) broadcast network boots, a DSM-CC user-to-network configuration message is received at the client that contains the source ID, carousel ID, and module ID for the BFS directory. Based on this information, block 140 installs a filter that allows (any version of) BFS directory data blocks to pass through the dispatcher 38. As a result, the current version of the BFS directory is retrieved from the data carousel. In a preferred embodiment, BFS directory structure is only delivered over the out-of-band source (which by definition is guaranteed to be available to data access system 30), and thus this filter only need be applied to that data source.

Decision block 144 determines when a BFS directory data block arrives, and, if so, block 146 reads and parses each incoming data block to construct the BFS directory structure. In the event an error occurs during the downloading process, decision block 148 returns processing to block 142 for re-installation of the initial BFS directory filter. This ensures that the current BFS directory is always downloaded from the data carousel.

Without an error, block 150 checks any registered interests against the newly downloaded BFS directory. At boot up, there will be no registered interests. However, for subsequently downloaded BFS directories, DII processor 44 interfaces with the interest manager 36 to verify registered interests. If a registered interest no longer exists or has been updated on the data carousel (as indicated by the newly downloaded BFS directory), then the interest is marked for deletion. Block 152 then installs (e.g., cached in memory) the newly downloaded BFS directory onto the client for use by data access system 30.

Once a BFS directory has been successfully downloaded, block 154 installs a different filter which only passes data blocks whose version number does not match the version number of the downloaded BFS directory. When the BFS directory is changed on the server, the version number will be modified, thereby allowing BFS directory data blocks to again pass through the dispatcher 38. Beginning in block 144, a new BFS directory can then be downloaded. In this way, data block processor 48 does not process redundant BFS directory information.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A broadcast data access system including a plurality of modules, the broadcast data access system for providing non-sequential data blocks indicative of a module from a data carousel to a multimedia client, the multimedia client comprising:

a plurality of requesting applications each for requesting a module;

an interest manager for receiving from at least one of the plurality of requesting applications an interest indicative of the requested module and for storing the interest, wherein the interest includes a first identifier identifying the requested module and a second identifier identifying the at least one of the plurality of requesting applications; and a dispatcher for receiving the non-sequential data blocks from the data carousel, and for providing the non-sequential data blocks to the at least one of the plurality of requesting applications determined by the first and second identifiers in the interest manager, wherein the interest manager removes the interest upon completely reassembling the requested module and providing the requested module to the at least one of the plurality of requested applications.

2. The broadcast data access system of claim 1, wherein the non-sequential data blocks further include the first identifier identifying the module.

3. The broadcast data access system of claim 2, wherein the dispatcher further allocates an area of memory, and wherein the non-sequential data blocks having the first identifier are stored in the area of memory.

4. The broadcast data access system of claim 3, wherein, when all of the non-sequential data blocks associated with the requested module are stored in the area of memory, the requested module is provided to the at least one of the plurality of requested applications.

5. The broadcast data access system of claim 3, wherein the dispatcher reassembles the non-sequential data blocks associated with the requested module in the area of memory.

6. The broadcast data access system of claim 1, wherein each of the non-sequential data blocks includes the first identifier that enables the interest manager to determine if there are multiple interests of the requested module.

7. The broadcast data access system of claim 6, wherein the dispatcher reassembles the non-sequential data blocks associated with the requested module in an area of memory.

8. The broadcast data access system of claim 7, wherein the dispatcher reassembles the non-sequential data blocks according to the first identifier and according to any multiple interests from the at least one of the plurality of requested applications.

9. The broadcast data access system of claim 1, the multimedia client further comprising a dynamic filter for allowing the non-sequential data blocks associated with the requested module to pass through to the dispatcher.

10. The broadcast data access system of claim 9, wherein, subsequent to the at least one of the plurality of requesting applications receiving the requested module, the dynamic filter is removed.

11. The broadcast data access system of claim 1, the multimedia client further comprising a broadcast file system for including a directory of the plurality of modules on the data carousel, wherein each of the plurality of modules including an updated first identifier.

12. The broadcast data access system of claim 11, wherein, when the interest manager receives the interest from the at least one of the plurality of requesting applications, the interest manager verifies the first identifier with the updated first identifier.

13. A broadcast data access system for providing non-sequential data blocks indicative of a module from a data carousel to a multimedia client, the multimedia client comprising:

a plurality of requesting applications each for requesting a module;

an interest manager for receiving from at least one of the plurality of requesting applications an interest indicative of the requested module and for storing the interest, wherein the interest includes a first identifier identifying the requested module and a second identifier for identifying the at least one of the requesting applications; and a dispatcher for receiving the non-sequential data blocks from the data carousel, for storing the non-sequential data blocks in memory, and, upon completion of the storage of all of the non-sequential data blocks associated with the requested module for providing the module to the at least one of the plurality of requesting applications, wherein the interest manager removes the interest upon the dispatcher providing the module to the at least one of the plurality of requesting applications.

14. The broadcast data access system of claim 13, the multimedia client further comprising a dynamic filter for allowing the non-sequential data blocks having the first identifier to pass through to the dispatcher.

15. The broadcast data access system of claim 13, wherein the plurality of requesting applications each requests a same module signifying a multiple interest for the same module.

16. The broadcast data access system of claim 15, wherein the dispatcher receives an indication from the interest manager signifying the multiple interest, and wherein the dispatcher stores the non-sequential data blocks in memory in accordance with the multiple interest.

17. The broadcast data access system of claim 13, the multimedia client further comprising a broadcast file system for including a directory of the plurality of modules on the data carousel, wherein each of the plurality of modules including an updated first identifier.

18. The broadcast data access system of claim 17, wherein, when the interest manager receives the interest from the at least one of the plurality of requesting applications, the interest manager verifies the first identifier with the updated first identifier.

* * * * *